United States Patent
Buhlman et al.

(10) Patent No.: US 10,649,939 B2
(45) Date of Patent: May 12, 2020

(54) HIGH DENSITY CABLING AND ROUTING FOR SWITCHED NETWORK NODES

(71) Applicant: Oracle International Corporation, Redwood Shores, CA (US)

(72) Inventors: Craig A. Buhlman, Boulder, CO (US); Kenneth Lee Manes, Brighton, CO (US); Steven Craig Cacka, Longmont, CO (US)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 15/681,238

(22) Filed: Aug. 18, 2017

(65) Prior Publication Data

US 2019/0044855 A1    Feb. 7, 2019

Related U.S. Application Data

(60) Provisional application No. 62/542,224, filed on Aug. 7, 2017.

(51) Int. Cl.
| | |
|---|---|
| *G06F 13/40* | (2006.01) |
| *G06F 13/42* | (2006.01) |
| *G06F 3/06* | (2006.01) |
| *H04L 12/741* | (2013.01) |
| *H04L 12/707* | (2013.01) |
| *H04L 12/935* | (2013.01) |

(52) U.S. Cl.
CPC ........ *G06F 13/4022* (2013.01); *G06F 3/0607* (2013.01); *G06F 3/0631* (2013.01); *G06F 3/0689* (2013.01); *G06F 13/4282* (2013.01); *H04L 45/745* (2013.01); *G06F 2213/0002* (2013.01); *H04L 45/24* (2013.01); *H04L 49/30* (2013.01)

(58) Field of Classification Search
CPC .............................. H04L 45/745; H04L 49/30
See application file for complete search history.

(56) References Cited

U.S. PATENT DOCUMENTS

| | | |
|---|---|---|
| 5,819,309 A | 10/1998 | Gray |
| 6,484,222 B1 | 11/2002 | Olson et al. |
| 6,865,053 B2 | 3/2005 | Bengds et al. |
| 7,469,274 B1 | 12/2008 | Ryu et al. |
| 9,842,016 B2 | 12/2017 | Batchelor et al. |

(Continued)

*Primary Examiner* — Jeffrey M Rutkowski
*Assistant Examiner* — Chae S Lee
(74) *Attorney, Agent, or Firm* — Invoke

(57) ABSTRACT

Systems and methods for establishing connections and routing data via high-density cabling are described herein. In one or more embodiments, a network switch or other device maps different respective subsets of differential pairs in a cable to different respective network nodes of a plurality of network nodes that are connected to the network device via the cable. The network device then receives a data packet for a particular network node of the plurality of network nodes that are connected to the network device via the cable. Responsive to receiving the data packet, the network device identifies a particular subset of differential pairs in the cable that are mapped to the particular network node. The network device then sends the data packet of the particular subset of differential pairs to the particular network node.

20 Claims, 9 Drawing Sheets

(56) References Cited

U.S. PATENT DOCUMENTS

| | | | |
|---|---|---|---|
| 2007/0294433 A1* | 12/2007 | Leigh | H04L 49/00 709/250 |
| 2008/0052437 A1 | 2/2008 | Loffink et al. | |
| 2012/0163395 A1* | 6/2012 | Shukla | H04L 12/56 370/409 |
| 2012/0278551 A1* | 11/2012 | Chakhaiyar | G06F 13/385 711/114 |
| 2013/0080697 A1 | 3/2013 | Dhandapani et al. | |
| 2017/0070431 A1* | 3/2017 | Nidumolu | H04L 45/745 |

* cited by examiner

FIG. 6

| Destination | Cable | Port |
|---|---|---|
| A | 1 | 2 |
| B | 1 | 3 |
| C | 2 | 7 |
| ... | | |

~600

| Cable 1 | |
|---|---|
| Port 1 | Port 1 |
| Pin | 10/100 Base-T | 1000 Base-T |
| 1 | TX+ | DA+ |
| 2 | TX- | DA- |
| 3 | RX+ | DB+ |
| 4 | RX- | DC+ |
| Port 2 | Port 1 |
| 5 | TX+ | DC- |
| 6 | TX- | DB- |
| 7 | RX+ | DD+ |
| 8 | RX- | DD- |
| Port 3 | Port 2 |
| 9 | TX+ | DA+ |
| 10 | TX- | DA- |
| 11 | RX+ | DB+ |
| 12 | RX- | DC+ |
| Port 4 | Port 2 |
| 13 | TX+ | DC- |
| 14 | TX- | DB- |
| 15 | RX+ | DD+ |
| 16 | RX- | DD- |
| Port 5 | Port 3 |
| ... | ... | ... |

602~

HIGH DENSITY CABLING AND ROUTING FOR SWITCHED NETWORK NODES

BENEFIT CLAIM; RELATED APPLICATIONS

This application claims the benefit of U.S. Provisional Patent Appln. No. 62/542,224, filed Aug. 7, 2017, the entire contents of which are incorporated by reference as if set forth in their entirety.

This application is related to U.S. application Ser. No. 15/681,253, entitled "SYSTEMS AND METHODS FOR MODULAR EXPANSION IN DATA STORAGE LIBRARIES", the entire contents of which are incorporated by reference as if set forth in their entirety.

TECHNICAL FIELD

The present disclosure relates, generally, to computer networks and, more specifically, to techniques for connecting and routing data to network nodes.

BACKGROUND

Network switches are devices used to route data packets to other devices in a computer network. The number of connections supported by a network switch may be limited by the design footprint of the switch packaging and the surface area consumed by cable routing channels. For example, current Ethernet switches generally use an RJ45 connector for each network connection. The area of an RJ45 connector is approximately 21.46 millimeters (mm.) in length, 11.68 mm. in width, and 8.3 mm. in height. Due to the footprint of RJ45 connectors, current rack-mounted Ethernet switches with a one rack unit (1 U) footprint are typically limited to between 38 and 40 connections. If more connections are needed, another switch may be added to the rack. However, this approach requires another rack unit, thereby increasing the overall footprint to 2 U worth of rack space for the switches. In addition, adding another switch requires more cables, which may lead to increased costs and space congestion within a rack frame.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example set of forwarding tables that map destination nodes to a subset of differential pairs within a cable, according to one or more embodiments;

DETAILED DESCRIPTION

Figure 1:
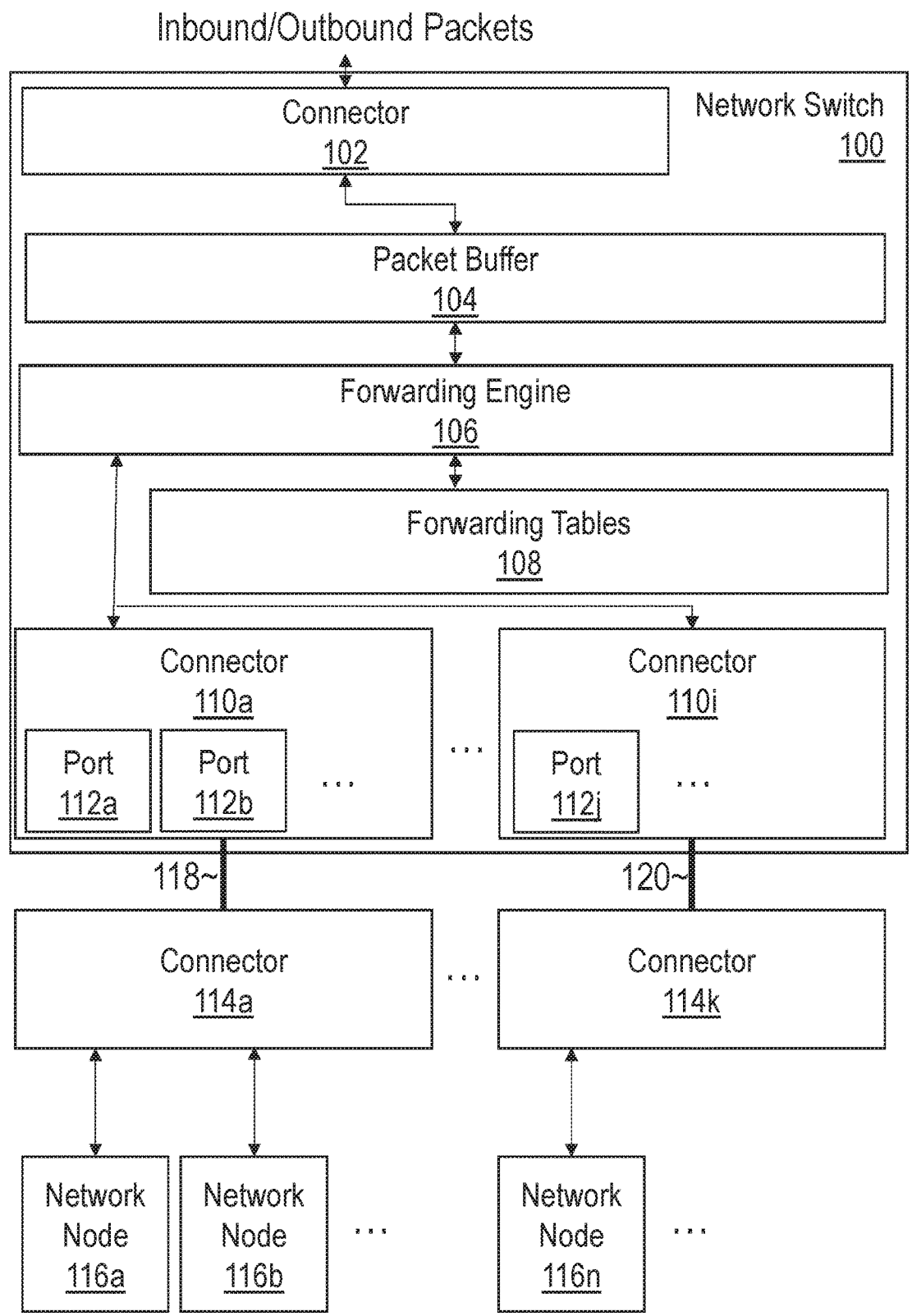
FIG. 1 illustrates an example network switch arrangement supporting high-density cables for routing data packets to connected network nodes, according to one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SWITCH ARCHITECTURE
3. CABLE CONFIGURATIONS
4. ROUTING PROCESS OVER HIGH-DENSITY CONNECTIONS
5. HARDWARE OVERVIEW
6. MISCELLANEOUS; EXTENSIONS

1. General Overview

Systems and methods for establishing connections and routing data via high-density cabling are described herein. A "high-density" cable in this context refers to a cable through which multiple network connections may be established. In order to establish multiple connections, a high-density cable may comprise a plurality of differential pairs where different connections are formed over different respective subsets of differential pairs. By establishing multiple connections over a single network cable, the physical space consumed per network connection may be significantly reduced. As a result, a greater number of connections may be made within the same physical space.

In one or more embodiments, a network device, such as a network switch, maps different respective subsets of differential pairs in a high-density cable to different respective network nodes of a plurality of network nodes that are connected to the network device via the cable. For example, Gigabit Ethernet connections may be formed over four differential pairs. If a cable has eight differential pairs, the network device may establish two separate Gigabit Ethernet connections: one over the first four differential pairs in the cable and another over the remaining four differential pairs. If the cable has sixteen differential pairs, then four separate Gigabit Ethernet connections, with each separate connection mapped to a distinct subset of four differential pairs in the cable. Other mappings may also be made depending on the type of connection being made and the number of differential pairs in the high-density cable. For example, 10/100 Ethernet connections may be formed over 2 differential pairs, so then the cable with sixteen differential pairs could have eight separate 10/100 Ethernet connections.

Once a plurality of connections through the high-density cable have been established, the network device may route data packets based on the differential pair mapping. For example, the network device may receive a data packet for a destination network node of the plurality of network nodes that are connected to the network switch via the high-density cable. Responsive to receiving the data packet, the network device identifies a particular subset of differential pairs in the cable that are mapped to the particular network node. The network device then sends the data packet of the particular subset of differential pairs to the destination network node. If another data packet is received for a second destination node connected via the cable, the network device may send the data packet over a different set of differential pairs based on the mapping. Thus, data packets may be routed to different endpoints over the same network cable.

2. Switch Architecture

In one or more embodiments, a network switch is configured to establish multiple network connections through a single high-density cable. To establish the connections, the network switch may map network ports to different subsets of differential pairs in the cable. Each network port serves as a communication endpoint to transmit and receive data packets to/from a corresponding network device (also referred to herein as a "network node") that is connected via the cable.

FIG. 1 illustrates an example network switch arrangement supporting high-density cables for routing data packets to connected network nodes, according to one or more embodiments. Referring to FIG. 1, network switch 100 generally comprises connector 102, packet buffer 104, forwarding engine 106, forwarding tables 108, and connectors 110a-i. In addition or as an alternative to the components illustrated, network switch 100 may include additional elements, such as an encryption engine and media access controllers, which are not illustrated for purposes of brevity. Additionally or alternatively, the function of one or more components of network switch 100 may be merged into one component or split across multiple components, depending on the particular implementation.

Connector 102 is used to couple network switch 102 to a data communications network through which inbound and outbound data packets are received and sent. The inbound/outbound data packets may be received/sent through a switch fabric and/or one or more external data communication networks, such as the Internet. In one or more embodiments, connector 102 is an Ethernet connector, such as an RJ45 connector. However, other connectors may also be used, depending on the particular implementation.

Connector 102 is coupled to packet buffer 104, which comprises volatile and/or non-volatile storage. Packet buffer 104 may comprise an ingress buffer and/or an egress buffer to for temporarily store incoming and/or outgoing data packets. Packet buffer 104 temporarily stores the data packets to account for delays that may occur during the routing process.

Forwarding engine 106 comprises hardware and/or software logic for routing data packets to destination endpoints. For example, forwarding engine 106 may perform lookups in forwarding tables 108 to determine the destination for an incoming data packet. Based on the lookup, forwarding engine 106 may control a switched circuit to forward data via the appropriate port 112a-j and connector 110a-i.

Forwarding tables 108 store a mapping between network addresses, such as internet protocol (IP addresses) and/or MAC addresses, and associated ports. The mapping may be maintained in volatile and/or non-volatile storage. Example forwarding tables are presented in further detail below.

Connectors 110a-i are high-density cable connectors for coupling network switch 100 to network nodes 116a-n. In one or more embodiments, connectors 110a-i comprise one or more serial attached small computer system interface (SAS) connectors. An example SAS connector may include, but is not limited to, a 68 pin SAS SFF-8087 cable. These cables have 16 differential pair conductors and 16 single ended sideband signals. As previously mentioned, a single Gigabit Ethernet connection may be mapped onto four differential pairs. Thus, four separate Ethernet connections may be mapped to each SAS connector. In other embodiments, custom built or other types of connectors may be used to establish the network connections.

Network switch 100 establishes multiple ports on each connector. For example, connector 110a comprises two or more ports, including port 112a and port 112b. Connector 110i may also comprise multiple ports, including port 112j.

Connections are established between network switch 100 and network nodes 116a-n via a plurality of high-density cables, including cable 118 and cable 120. Cable 118 is coupled to connector 110a and 114a, and cable 120 is coupled between connector 110i and connector 114k. In one or more embodiments, cable 118 and cable 120 each comprise a plurality of differential pairs. For example, cable 118 and cable 120 may be SAS cables or any other cable supporting differential signaling over a plurality of differential pairs of conductors.

Multiple network nodes are connected to network switch 100 via each high-density cable. For example, network nodes 116a and 116b are each coupled to connector 114a, which is connected to network switch 100 via cable 118. Network node 116n is coupled to network switch via connector 114k and cable 120. Additional network nodes may also be coupled through each of the connectors depending on the number of connections supported by each high-density network cable. Network nodes 116a-n may be any network endpoint devices, such as network attached storage devices, database servers, application servers, and/or any other network host.

A network switch may comprise a physical mapping of received signals onto the signal pins of the high-density cable connectors. In the context of an Ethernet signal, for instance, data packets are generally received over four twisted pair conductors, with each twisted pair conductor corresponding to two separate pins in an Ethernet connector. These differential signals may be mapped to different pin subsets of a high-density cable connector. A switched circuit may connect the differential signals to the appropriate pin subset based on a data packet's destination endpoint.

Figure 2:
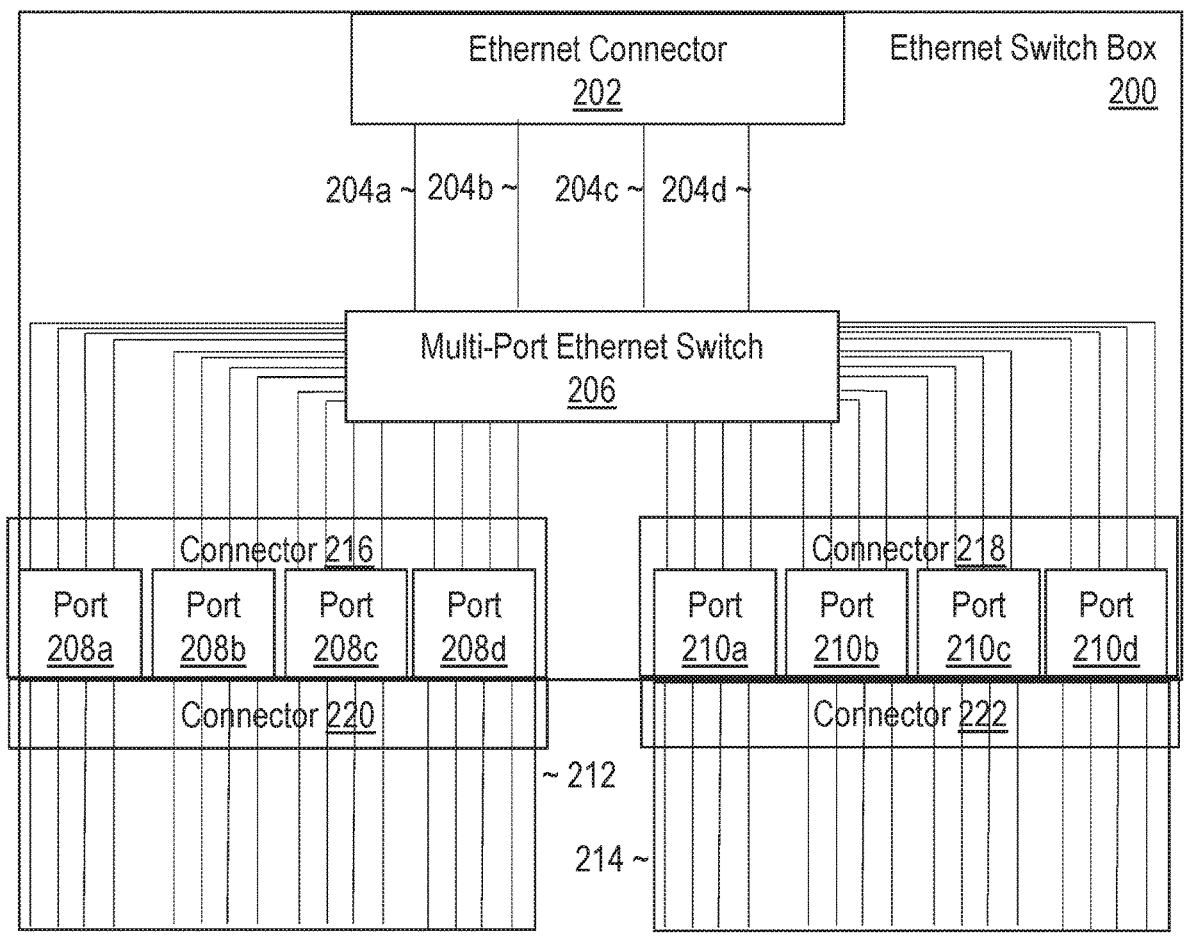
FIG. 2 illustrates an example multi-port ethernet switch that maps differential pairs of an Ethernet connector to differential pairs in a set of high-density cables, according to one or more embodiments.

FIG. 2 illustrates an example multi-port ethernet switch that maps differential pairs of an Ethernet connector to differential pairs in a set of high-density cables, according to one or more embodiments. Referring to FIG. 2, ethernet switch box 200 generally comprises ethernet connector 202, multi-port Ethernet switch 206, ports 208a-d, ports 210a-d, and connectors 216, 218.

Ethernet connector 202 may be an RJ45 connector or any other Ethernet connector receiving an Ethernet signal. Four differential pairs of conductors (differential pairs 204a-d) are coupled between ethernet connector 202 and multi-port ethernet switch 206. A differential pair in this context may comprise a twisted pair or wires, a pair of traces on a circuit board, or any other pair of conductors through which differential signaling may be transmitted.

Multi-port ethernet switch 206 comprises a switched circuit that connects the differential Ethernet signal to a corresponding port. Multi-port ethernet switch 206 may comprise a forwarding engine and forwarding tables to select the port based on the destination endpoint of a data packet. For example, if a data packet received via differential pairs 204a-d, then multi-port ethernet switch may select one of ports 208a-d or ports 210a-d based on the target destination for the data packet.

Ports 208a-d represent four separate ports that are associated with the same 32 pin connector, 216. Each port is associated with eight respective pins of the 32-pin connector, 216. The eight pins associated with each port are coupled to four respective differential pairs within cable 212, through cable connector 220. Thus, port 208a is associated with a first set of four differential pairs, port 208b is associated with a second set of four differential pairs, port 208c is associated with a third set of differential pairs, and port 208d is associated with a fourth set of differential pairs.

Ports 210a-d represent four separate ports that are associated with cable 214 and a corresponding connector, 218. Each of ports 210a-d is associated with eight respective pins of a connector, 218, that are electrically coupled to four differential pairs of cable 214, through cable connector 222. Thus, as with cable 212, four distinct connections may be established through cable 214.

Multi-port ethernet switch 206 may send an Ethernet data packet over any subset of differential pairs connected via ports 208a-d and ports 210a-d. For example, if a data packet has a destination endpoint to a network node coupled via port 208b, then the data packet may be dispatched via the eight pins (of the 32 pins in the connector, 216) mapped to port 208b. The signal traverses through the eight pins of the port over the four differential pairs in cable 212 to the destination endpoint. In this manner, signals received over differential pairs 204a-d may be routed over subsets of differential pairs within cable 212 and cable 214.

Although only eight ports and two cables are depicted, multi-port Ethernet switch 206 may be connected to several additional ports and cables. As indicated further below, the space savings allow for at least 64 ports and 16 cables to be connected, establishing 64 distinct Gigabit Ethernet connections or 32 redundant connections. In these embodiments, multi-port Ethernet switch 206 may include additional conductive traces connected to additional ports (not depicted). The additional ports may be coupled to subsets of differential pairs of additional cables other than cable 212 and 214. Thus, the number of ports and cables connected to multi-port Ethernet switch 206 may vary from implementation to implementation.

3. Cable Configurations

Figure 3A:
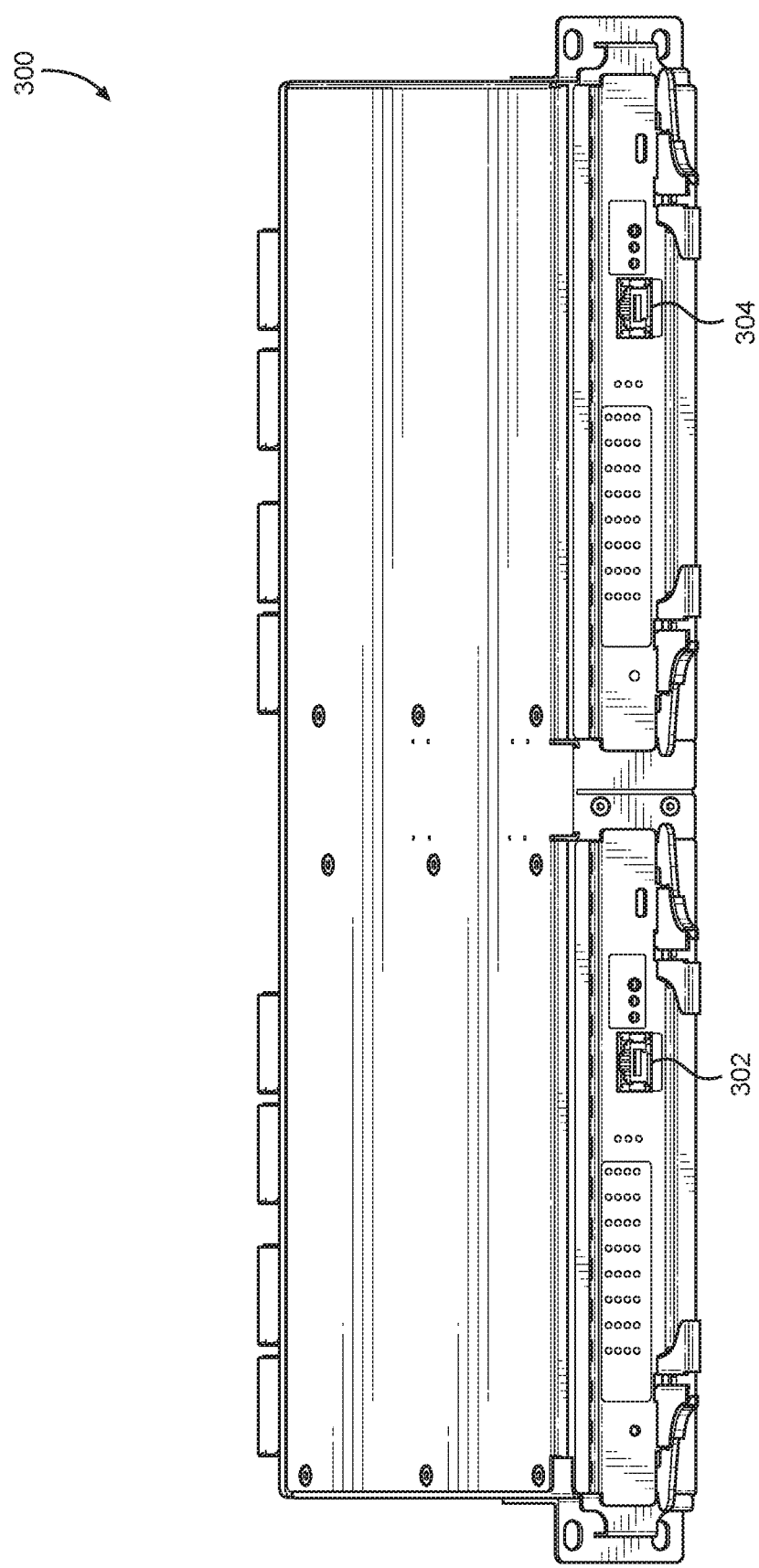
FIG. 3A illustrates a front view of an example network switch that may be used to routes data packets through a set of high-density cable connections, according to one or more embodiments.
Figure 3B:
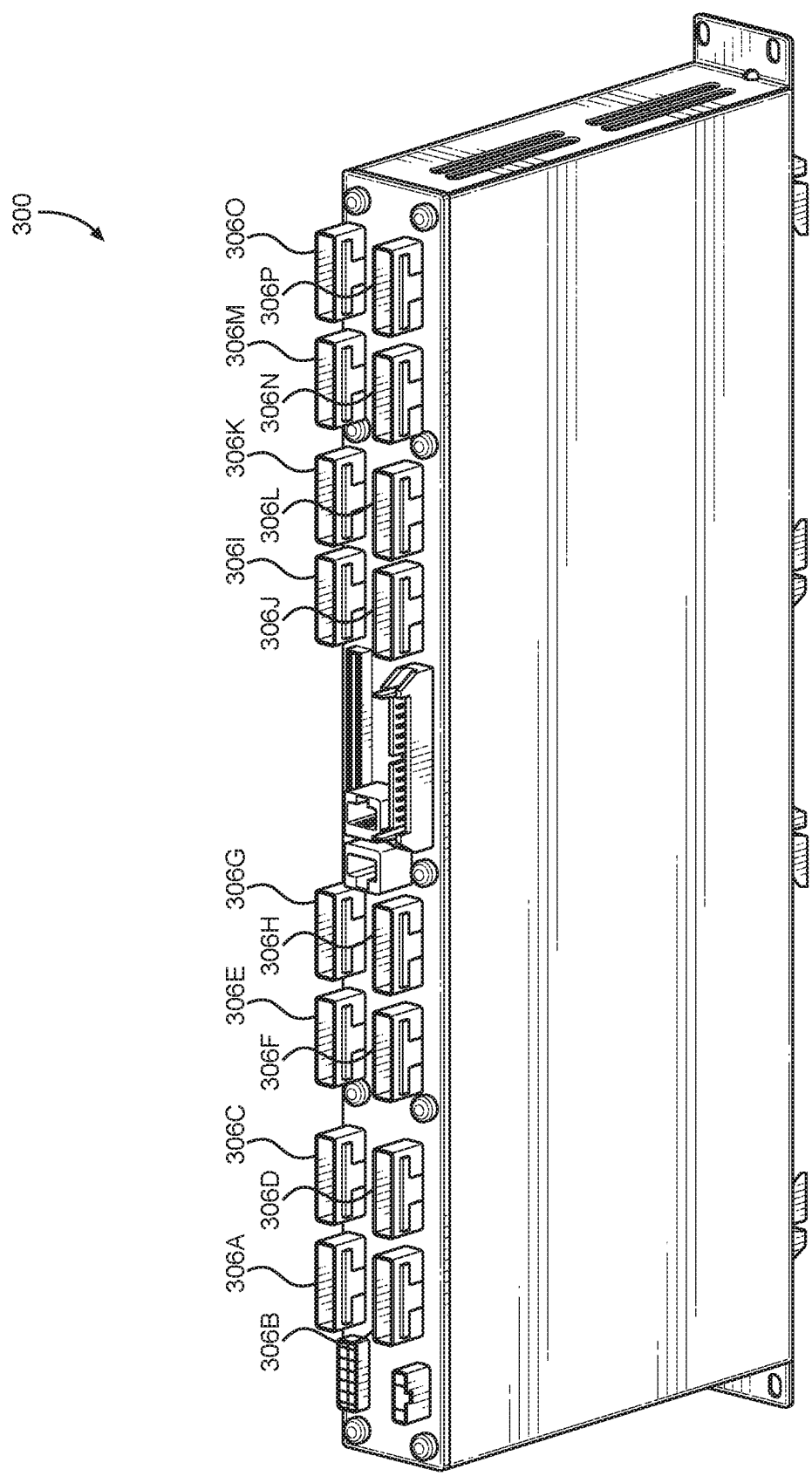
FIG. 3B illustrates a rear view of an example network switch that may be used to routes data packets through a set of high-density cable connections, according to one or more embodiments.

High-density network cabling may yield significant savings in cable congestion and design footprint. For instance, FIG. 3A and FIG. 3B illustrate different views of a rack-mounted network switch that may leverage high-density cables to increase the number of network connections provided in one rack unit (U) of physical space. Referring to FIG. 3A, a front view of network switch 300 is illustrated. Network switch 300 comprises two RJ45 ports on the front panel including port 302 and port 304. Each of these ports may be coupled to a separate, redundant Ethernet switch card within switch box. In addition, the dimensions of network switch 300 substantially conforms to 1 U of rack space, which is approximately 1.75 inches in height. To fit within a slot during mounting, the actual height of the front panel of the switch may be slightly less than 1.75 inches (e.g., between 1.70 and 1.74 inches).

FIG. 3B illustrates a rear view of network switch 300 according to one or more embodiments. As illustrated, the rear panel of network switch 300 comprises sixteen separate SAS connectors (connectors 306a-p). Since the physical area for an SAS connector is less than half the area of four RJ45 connectors, this arrangement allows 64 Ethernet connections between a 1 U Ethernet switch and 64 different endpoints. In cases where a redundant Ethernet card is provided, two Gigabit Ethernet connections may be made to each of 32 separate endpoints within an existing frame. By contrast, to establish the same number of connections using standard RJ45 connectors would involve a greater number of connectors (64 separate connectors), which would consume more than twice as much surface area. Thus, the high-density connectors allow for a greater number of connections to be routed within the same physical space.

Figure 4A:
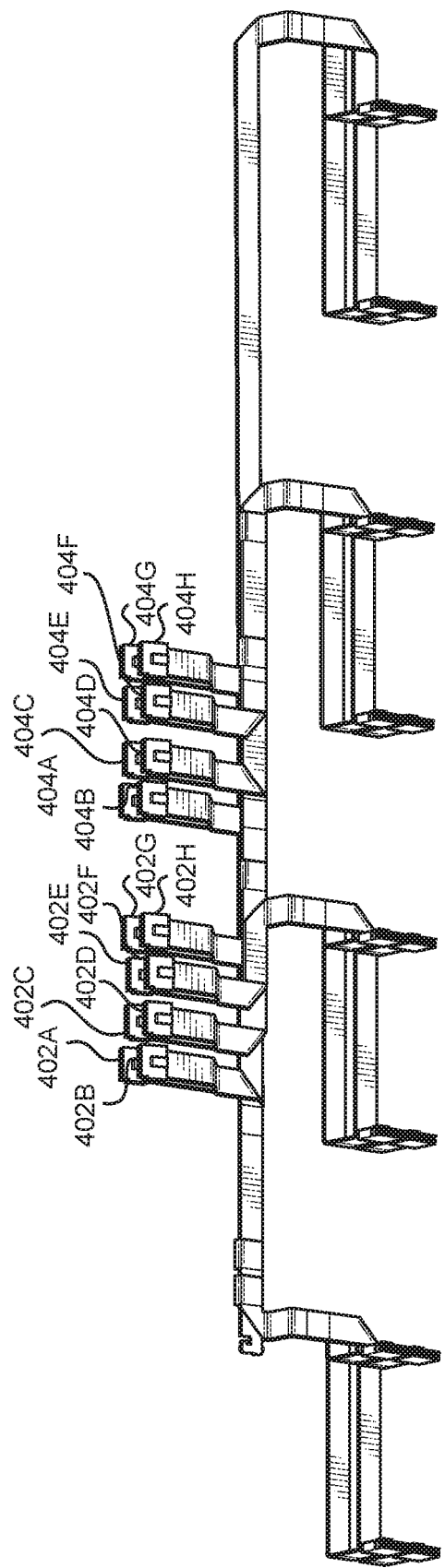
FIG. 4A illustrates an example arrangement of high-density cables that may be used to provide redundant connections between a network switch and a set of network nodes, according to one or more embodiments.

FIG. 4A illustrates an example arrangement of high-density cables that may be used to provide redundant connections between a network switch and a set of network nodes, according to one or more embodiments. Each of SAS cables 402a-h provide four Gigabit Ethernet connections between a network switch and four corresponding network endpoints. SAS cables 404a-h may be used to provide redundant connections to the same network endpoints or may be used to provide separate connections to additional network endpoints. A flat SAS cable as illustrated has a cross-sectional area of approximately 43 mm. squared. By comparison, an RJ45 Ethernet cable has a cross-sectional area of approximately 28 mm. squared, or 122 mm. sq. for four cables. By using SAS cables, twice as many Ethernet connections may be routed in the same physical space consumed by RJ45 cables.

Figure 4B:
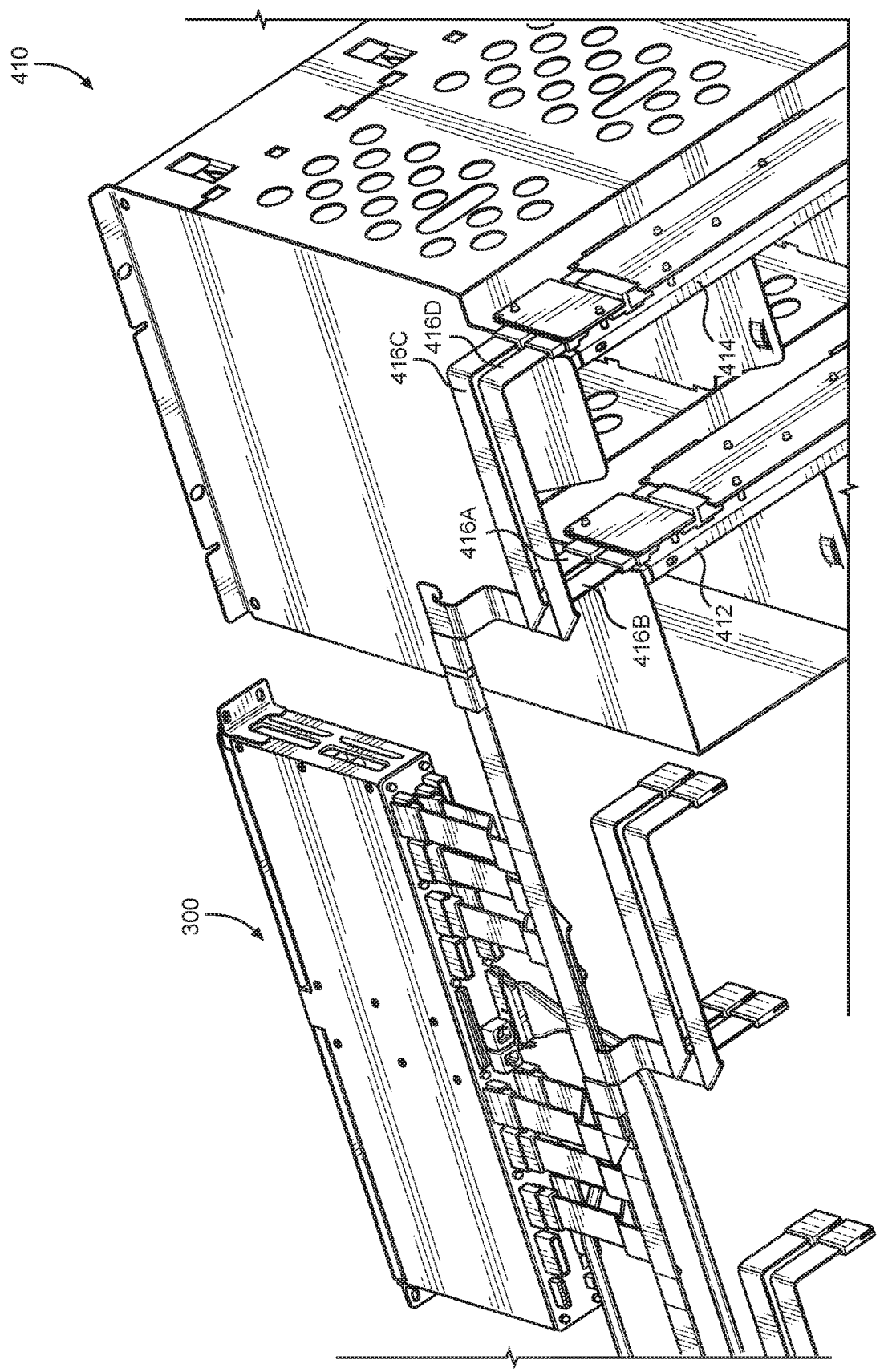
FIG. 4B illustrate an example installation of high-density cables that provide redundant connections between a network switch and a set of network nodes, according to one or more embodiments.

FIG. 4B illustrate an example installation of high-density cables that provide redundant connections between a network switch and a set of network nodes, according to one or more embodiments. Network switch 300 is connected to multiple network cards within frame 410 including network card 412 and network card 414. Each network card has two connectors to provide redundancy in the Ethernet connections. In the event that one cable becomes disconnected or malfunctions, connectivity may be maintained through the redundant connections. Each of cables 416a-d comprises four differential pairs to provide eight redundant Gigabit Ethernet connections to network endpoints within frame 410. Example endpoints that may be plugged into frame 410 may include, but are not limited to drive trays, server modules, and other rack-mounted devices.

4. Routing Process Over High-Density Connections

In one or more embodiments, a network device is configured to route data packets over a subset of pins in the high-density cable and connectors. For example, a high-density cable may comprise eight or more differential pairs. A Gigabit Ethernet signal may be sent over four differential pairs and does not need to be sent over all of the pins/conductors in the cable. The network device may select the connector pins and differential pairs over which to send the data packet based on the endpoint destination.

Figure 5:
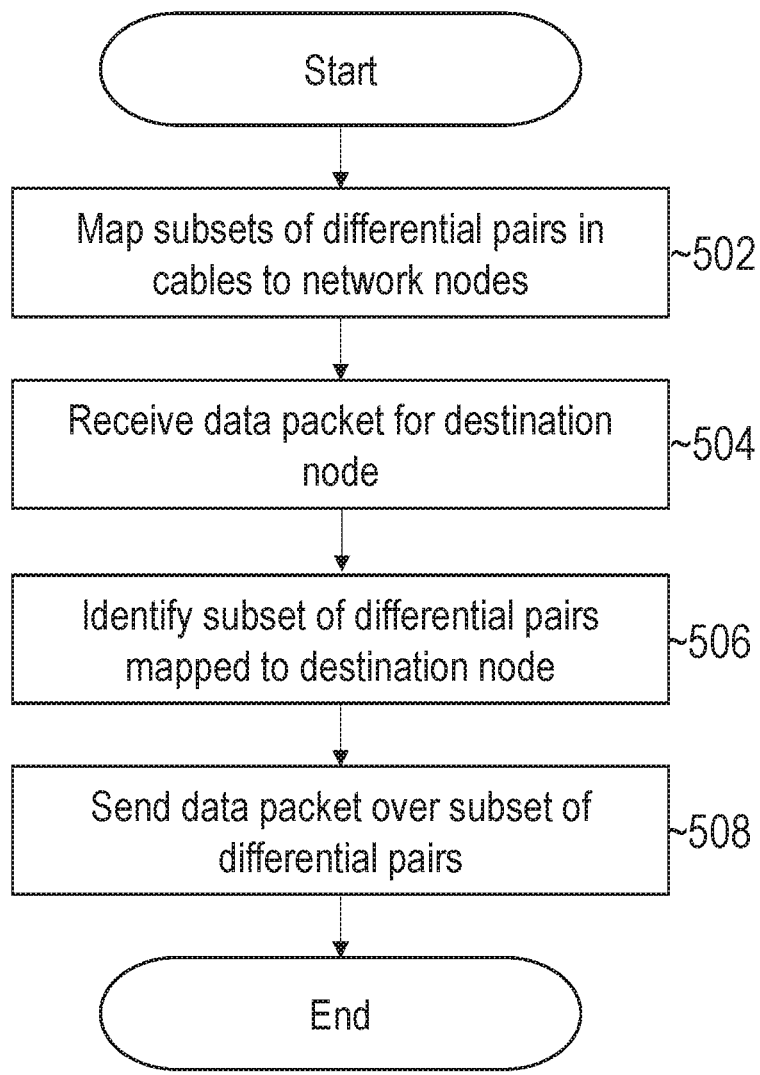
FIG. 5 illustrates an example process for routing data over high-density connections between a network switch a set of network nodes, according to one or more embodiments.

FIG. 5 illustrates an example process for routing data over high-density connections between a network switch a set of network nodes, according to one or more embodiments. The process includes mapping subsets of differential pairs in a cable to network nodes that are coupled via the cable (Operation 502). In one or more embodiments, this step comprises registering network addresses in a forwarding table. For example, devices that are connected to a network switch may send a MAC address and/or IP address over a subset of pins/differential pairs in a high-density cable. Responsive to receiving the address, the network switch may map the network address to the subset of pins and differential pairs over which the address was received. In one or more embodiments, the messages between the network switch and the network nodes to determine the network address may conform to the address resolution protocol (ARP). Additionally or alternatively, the mapping may be maintained in one or more forwarding tables, such as a forwarding information base.

In one or more embodiments, mapping the differential pairs in the high-density cables comprises assigning the subset of differential pairs and the associated connector pins a port identifier. A port identifier may be a number, a string, or an alphanumeric sequence that uniquely identifies the network port among a plurality of network ports in the switch. The network switch may assign different subsets of pins in the same connector/cable different port identifiers. For example, ports 208a-d may all be associated with the same connector and cable (cable 212) but may be assigned different port numbers.

After the mapping is complete, the process continues by receiving a data packet for a destination node (Operation 504). The data packet may be contained in an Ethernet frame or may conform to one or more other communication protocols of the IP suite. The destination may be determined based on an IP address, MAC address and/or any other form of network address received with the data packet.

Responsive to receiving the data packet, the process identifies a subset of differential pairs that have been mapped to the destination node (Operation 506). In one or more embodiments, the network switch may determine the mapping from a set of one or more forwarding tables. For example, the network switch may determine an IP address and/or MAC address for the destination node included with the data packet. Based on the address, the network switch may perform a lookup in the forwarding tables to determine which subset of pins and differential pairs have been mapped to the destination node.

After determining the subset of differential pairs mapped to the destination node, the data packet is sent out the selected subset of differential pairs (Operation 508). For example, multi-port ethernet switch 206 may dispatch the signals over one of ports 208a-d or 210a-d that is connected to the destination node. Multi-port ethernet switch 206 may use differential signaling to transmit the packet via the ports and corresponding subset of differential pairs.

FIG. 6 illustrates an example set of forwarding tables that map destination nodes to a subset of differential pairs within a cable, according to one or more embodiments. Table 600 comprises a mapping between destination nodes, cable identifiers, and port identifiers. The "Destination" column may store a destination identifier, such as a network address, hostname, etc. The destination identifier is mapped to a cable identifier and a port identifier. As illustrated, a single cable (and corresponding connector) may be associated with multiple ports.

Table 602 illustrates a pin mapping for each cable. Cable 1 and the corresponding connector is mapped to a plurality of ports. Each port is mapped to four pins (representing two differential pairs) for a 10/100 Base-T connection and eight pins (representing four differential pairs) for a 1000 Base-T connection. A 10/100 MB Ethernet signal may be transmitted using four of the pins over two differential pairs. The Gigabit Ethernet signal (1000 Base-T) is sent using eight pins over four differential pairs per the mapping.

5. Hardware Overview

According to one embodiment, the techniques for routing data packets over high-density cables are implemented by one or more special-purpose computing devices. The special-purpose computing devices may be hard-wired to perform the techniques, or may include digital electronic devices such as one or more application-specific integrated circuits (ASICs) or FPGAs that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
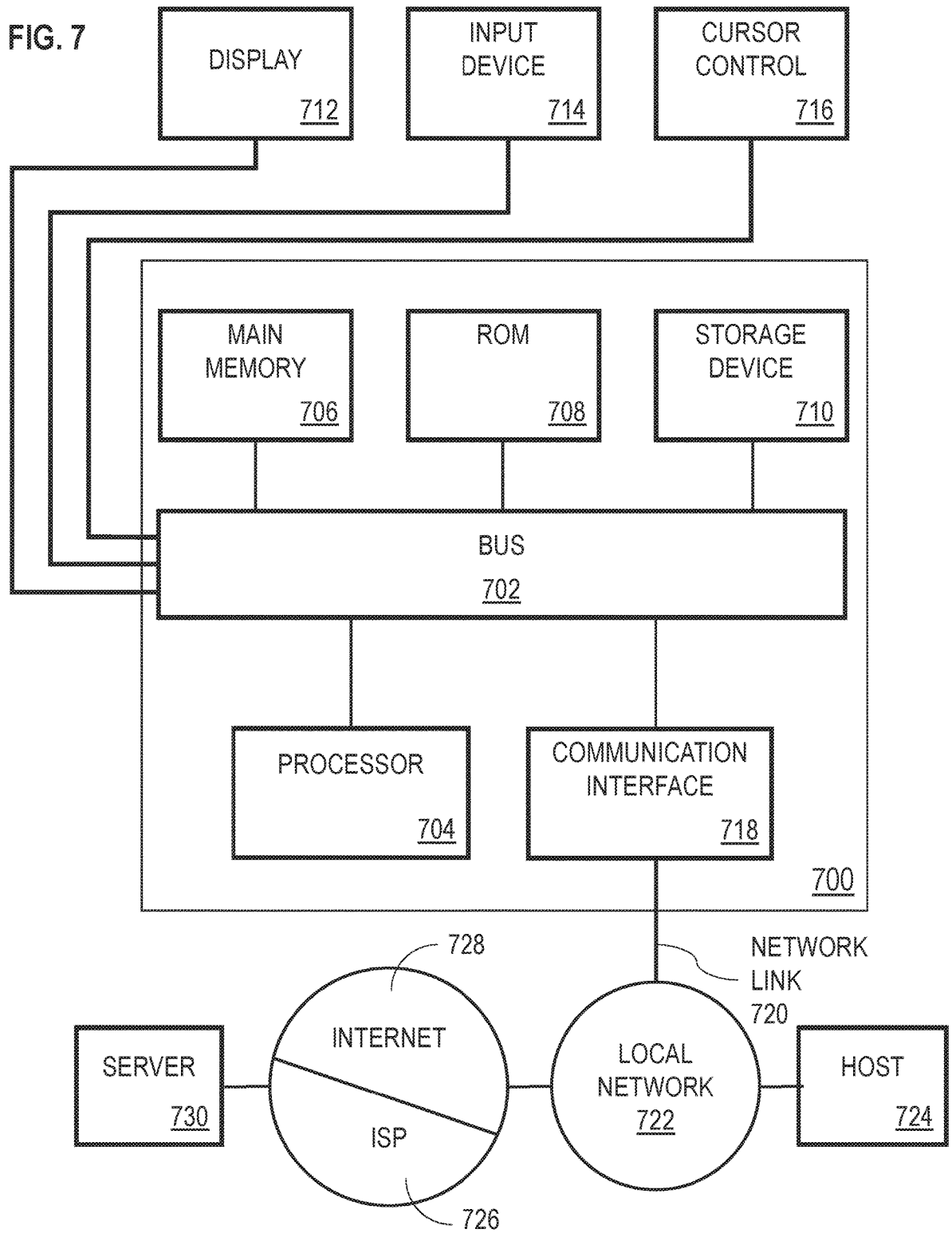
FIG. 7 illustrates an example computer system upon which one or more embodiments may be implemented.

For example, FIG. 7 is a block diagram that illustrates computer system 700 upon which one or more embodiments may be implemented. Computer system 700 includes bus 702 or other communication mechanism for communicating information, and hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT), liquid crystal display (LCD), or light-emitting diode (LED), for displaying information to a computer user. Input device 714, which may include physical and/or touchscreen based alphanumeric keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, server 730 might transmit a requested code for an application program through Internet 728, ISP 726, local network 722 and communication interface 718.

The received code may be executed by processor 704 as it is received, and/or stored in storage device 710, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   mapping, by a network routing device within a forwarding table, different respective subsets of differential pairs in a single cable, coupled to the network routing device via a high-density connector including a plurality of pins, to different respective network nodes of a plurality of network nodes that are connected to the network routing device via the single cable;
   registering, within the forwarding table, a different respective network address to each network node of the plurality of network nodes, such that a first network node coupled to a first subset of differential pairs of the single cable is assigned a first network address and a second network node coupled to a second subset of differential pairs of the single cable is assigned a second network address;

receiving, by the network routing device, a data packet for the first network address assigned to the first network node of the plurality of network nodes that are connected to the network routing device via the single cable, wherein the first network node is a destination node for the data packet;

determining, by the network routing device based on said mapping within the forwarding table, that the first subset of differential pairs in the single cable are mapped to the first network node;

sending, by the network routing device, the data packet over the first subset of differential pairs in the single cable that are mapped to the first network node, wherein sending the data packet includes physically connecting, via a switched circuit, a signal including the data packet to a first subset of pins in the high-density connector connected to the first subset of differential pairs such that the signal is not sent over a second subset of pins in the high-density connector and the second subset of differential pairs in the single cable.

2. The method of claim 1, wherein mapping, by the network routing device, different respective subsets of differential pairs in the single cable comprises mapping two or more network ports to the single cable including a first network port mapped to the first subset of differential pairs and a second network port mapped to the second subset of differential pairs.

3. The method of claim 1, wherein the first subset of differential pairs consists of two or four differential pairs and wherein the second subset of differential pairs consists of two or four differential pairs.

4. The method of claim 1, wherein the single cable is one of a plurality of cables that are connected to the network routing device, the method further comprising mapping, by the network routing device, for each respective cable of the plurality of cables, different respective subsets of differential pairs to different respective network nodes that are connected via the respective cable.

5. The method of claim 1, wherein the data packet is received by the network routing device over a network cable consisting of two or four twisted pairs; wherein the single cable that connects the first network node to the network routing device comprises at least eight twisted pairs; and wherein the network routing device sends the data packet to the first network node over two or four twisted pairs of the at least eight twisted pairs in the single cable.

6. The method of claim 1, wherein the network routing device is a rack-mounted device with a footprint of one rack unit and provides more than forty network connections within the footprint of one rack unit.

7. The method of claim 1, wherein the data packet is received by the network routing device in an Ethernet frame.

8. The method of claim 1, wherein the single cable is a serial attached small computer system interface (SAS) cable and wherein four or more network nodes are connected to the device via the SAS cable.

9. An apparatus comprising:

a set of one or more high-density connectors, wherein each respective high-density connector in the set of one or more high-density connectors includes a plurality of pins and is couplable to a respective cable having a plurality of twisted pairs of conductors; and a network routing device coupled to the set of one or more high-density connectors, wherein the network routing device is configured to route multiple network connections through each respective high-density connector in the set of one or more high-density connectors such that two or more network connections are routed through different twisted pairs of a single cable connected to the respective high-density connector in the set of one or more high-density connectors, wherein the network routing device maintains a forwarding table that maps different respective network addresses to different respective twisted pairs of the single cable connected to the respective high-density connector in the set of one or more high-density connectors;

wherein the network routing device routes a network connection by physically connecting, via a switched circuit, a signal including at least one data packet to a first subset of pins in the high-density cable connector connected to a first subset of differential pairs of a single cable such that the signal is not sent over a second subset of pins in the high-density cable connector and a second subset of differential pairs in the single cable.

10. The apparatus of claim 9, wherein the network routing device is an Ethernet switch.

11. The apparatus of claim 9, wherein the apparatus is a rack-mounted device that has a height of one rack unit.

12. The apparatus of claim 9, wherein the set of one or more high-density connectors includes sixteen high-density connectors couplable to sixteen separate cables; and wherein the network routing device is configured to route at least one of sixty-four distinct Gigabit Ethernet connections or thirty-two redundant Gigabit Ethernet connections through the sixteen separate cables.

13. The apparatus of claim 9, wherein the network routing device is configured to route four network connections through the single cable that is coupled to the respective high-density connector in the set of one or more high-density connectors; wherein the four network connections are established through different subsets of twisted pairs in the single cable.

14. The apparatus of claim 9, wherein the respective cable is a serial attached small computer system interface (SAS) cable.

15. The apparatus of claim 14, wherein the network routing device is configured to establish at least four network connections with four separate network endpoints through the SAS cable.

16. The apparatus of claim 9, wherein each respective high-density connector of the set of one or more high-density connectors is configured to couple to an SAS cable to route two or more Gigabit Ethernet connections or four or more 10/100 Ethernet connections.

17. The method of claim 1, wherein the single cable is a first cable of a plurality of cables, the method further comprising establishing a redundant connection between the network routing device and the first network node using a subset of differential pairs from a second cable of the plurality of cables.

18. The method of claim 17, wherein the network routing device establishes a second redundant connection with the second network node using different respective differential pairs in the first cable and the second cable.

19. The apparatus of claim 9, wherein the network routing device and the set of one or more high-density connectors have a footprint of one rack unit, wherein the network routing device is configured to establish more than twenty redundant connections or forty individual connections.

20. The apparatus of claim 9, wherein the network routing device is configured to maintain a redundant connection with a first network node and a second network node using different differential pairs of a first cable and a second cable such that a network connection is maintained with both the first network node and the second network node if the first cable or the second cable becomes disconnected or malfunctions.

* * * * *